US006546379B1

(12) United States Patent
Hong et al.

(10) Patent No.: US 6,546,379 B1
(45) Date of Patent: Apr. 8, 2003

(54) CASCADE BOOSTING OF PREDICTIVE MODELS

(75) Inventors: Se June Hong, Yorktown Heights, NY (US); Barry K. Rosen, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/427,064

(22) Filed: Oct. 26, 1999

(51) Int. Cl.$^7$ ............................................... G06F 15/18
(52) U.S. Cl. ....................................................... 706/14
(58) Field of Search .............................. 706/14, 25, 47

(56) References Cited

U.S. PATENT DOCUMENTS 5,819,247 A * 10/1998 Freund et al. ................ 706/25

OTHER PUBLICATIONS

Zijian Zheng et al; Integrating Boosting and Stochastic attribute selection committees for Further Improving the Performance of Decision tree Learning; Sep. 1998; IEEE; 0–7803–5214–9/98; 216–223.*

David w. Opiz et al; An Empiriical Evaluation of Bagging and Boosting for Artificial Neural Networks; Aug. 1997; IEEE; 0–7803–4122–8/97; 1401–1405.*

Yoav Freund; An improved algorithm fan its implications on learning complexity; Aug. 1992; ACM; 0–89791–498–8/92/0007/0391; 391–398.*

S. Weiss et al., "Optimized Rule Induction", IEEE Expert (8:6), Dec. 1993, pp. 61–69.

V. Vapnik, "Statistical Learning Theory", Published by John Wiley & Sons, Inc., 1998.

R. Schapire et al., "Improved Boosting Algorithms Using Confidence–rated Predictions", Proceedings of the 11$^{th}$ Annual Conference on Computational Learning Theory, 1998.

J. Shafer et al., "SPRINT: A Scalable Parallel Classifier for Data Mining", Proceedings of the 22$^{nd}$ VLDB Conference Mumbai (Bombai), India, 1996.

G. Ridgeway, et al., "Interpretable Boosted Naïve Bayes Classification", Proceedings of the 4$^{th}$ International Conference on Knowledge, Discovery and Data Mining, (KDD–98), pp. 101–104, Aug. 1998.

J. Rao, et al., "Visualizing Bagged Decision Tree", Proceedings of the 3$^{rd}$ International Conference on Knowledge, Discovery and Data Mining, (KDD–97), pp. 243–246, Aug. 1997.

(List continued on next page.)

Primary Examiner—Wilbert L. Starks, Jr.
Assistant Examiner—Joseph P. Hirl
(74) Attorney, Agent, or Firm—Whitham, Curtis & Christofferson, P.C.; Stephen C. Kaufman

(57) ABSTRACT

A method of boosting of predictive models, called cascade boosting, for resolving the interpretability problem of previous boosting methods while mitigating the fragmentation problem when applied to decision trees. This method of cascade boosting always applies a single weak model to any given data point. An improvement to the common method of boosting lies in how weak models are organized in a decision list rather than a weighted average. Cascade boosting resolves the interpretability problem of previous boosting methods while mitigating the fragmentation problem when applied to decision trees. Cascade boosting is simplest when applied to segmented predictive models but may also be applied to predictive models that do not explicitly segment the space of possible data points. The predictive model resulting from cascade boosting has fewer rules, or tree leaves, thereby enabling a modeler to better understand the correlations among the data.

15 Claims, 7 Drawing Sheets

OTHER PUBLICATIONS

Y. Freund, et al., "Experiments with a New Boosting Algorithm", Proceedings of the International Machine Learning Conference, pp. 148–156 (1996).

E. Frank, et al., "Generating Accurate Rule Sets Without Global Optimization", Machine Learning: Proceedings of the 15$^{th}$ International conference (ICML '98), pp. 144–151, Jul. 1998.

P. Domingos, "Efficient Specific-to-General Rule Induction", Proceedings of the 2$^{nd}$ International Conference on Knowledge, Discovery and Data Mining, (KDD–96), pp. 319–322, Aug. 1996.

P. Clark, et al., "The CN2 Induction Algorithm", Machine Learning (3), pp. 261–283 (1989).

* cited by examiner

CASCADE BOOSTING OF PREDICTIVE MODELS

BACKGROUND OF THE INVENTION

1. Field of the Invention

The present invention generally relates to methods for building predictive models from a given population of data points, and more particularly to a family of methods known as boosting or adaptive sampling, wherein multiple models are constructed and combined in an attempt to improve upon the performance obtained by building a single model. The invention resolves the interpretability problems of previous boosting methods while mitigating the fragmentation problem when applied to decision trees.

2. Background Description

Predictive modeling refers to generating a model from a given set of data points (also called "examples" or "records"), where each point is comprised of fields (also called "attributes" or "features" or "variables"), some of which are designated as target fields (also called "dependent variables") whose values are to be predicted from the values of the others (also called "independent variables").

There are many known methods of building predictive models from data for many different families of models, such as decision trees, decision lists, linear equations, and neural networks. The points used to build a model are known as training points. The performance of a model is judged by comparing the predicted values with the actual values of target fields in various populations of points. It is important to perform well on "new" or "unseen" points that were not used to train the model. In practical applications, the values of target fields become known at later times than the values of other fields. Actions based on accurate predictions can have many benefits. For example, a retailer can mail promotional material to those customers who are likely to respond favorably, while avoiding the costs of mailing the material to all customers. In this example, customer response is a target field. Other fields might include past responses to similar promotions, other past purchases, or demographic information.

Given some method of building predictive models, one could simply apply the method once to the available training points, or to as large a sample from that population as the underlying method can work with. Boosting refers to a family of general methods that seek to improve the performance obtained from any given underlying method of building predictive models by applying the underlying methods more than once and the combining the resulting "weak" models into a single overall model that, although admittedly more complex than any of the "weak" models obtained from the underlying method, may make more accurate predictions. The term "weak", as used in connection with boosting, is a technical term used in the art; a "weak" model is simply a model with imperfect performance that one hopes to improve by somehow combining the "weak" model with other "weak" models built by the same underlying method, but from different samples of the available training points. A model with good performance may still be considered "weak" in this context. Boosting is a process of adaptive resampling that builds a weak model, determines how to choose another training sample by observing the performance of the weak model(s) already built, builds another weak model, and so on.

FIG. 1 illustrates the end result of the common method of boosting. A list of admittedly weak models (1001, 1002, . . . , 1099) is available, and every one of those models is applied to any given point for which a prediction is wanted in 1000. The actual number of weak models could be more or less than the 99 indicated in FIG. 1. Tens or hundreds of weak models are commonly used. Such an ensemble of models comprising the final weighted model is not humanly understandable. To return a single prediction, a weighted average of all the weak predictions is computed in block 1100. As commonly practiced (see, for example, Y. Freund and R. Schapire, "Experiments with a New Boosting Algorithm", *Proceedings of the International Machine Learning Conference*, pp. 148–156 (1996), or R. Schapire and Y. Singer, "Improved Boosting Algorithms Using Confidence-Rated Predictions", *Proceedings of the $11_{th}$ Annual Conference on Computational Learning Theory* (1998)), boosting builds both a list of weak models (1001, 1002, . . . , 1099) and a corresponding list of weights for averaging the predictions of those models, as in step 1100.

The method of building the lists is a form of adaptive resampling, as illustrated in FIG. 2. Given a population of training points 2001 and a trivial initial probability distribution D_1 2011 where all points are equally probable, any given model-building method yields a model M_1 2012 to serve as the first weak model. If the given model-building method cannot deal directly with a large population of training points together with a probability distribution on those points, then a sample of any convenient size may be drawn from the population 2001 according to the distribution 2011. To determine the weight of the predictions of M_1 and to build the next weak model, the next probability distribution D_2 2021 is computed by observing the weighted average performance of M_1 on the entire population 2001, with the performance for each point weighted by the probability of that point according to the current distribution 2011. The function that computes the weight of M_1 will reward better performance with the higher weight for M_1, while the function that computes the next probability of each point ensures that points where M_1 performs poorly will be more likely to be chosen than are points with the same current probability where M_1 performs well.

Given the same population 2001 and the new probability distribution 2021, the same given model-building method yields a model M_2 2022 to serve as the second weak model. The process of observing performance and determining both a weight and a new distribution continues for as long as desired, leading eventually to a final distribution D_99 2991 and then a final weak model M_99 2992. The last step in boosting as commonly practiced is a truncation of the repeated process: observed performance determines the weight of M_99, but the computation of a new distribution is omitted. Boosting as commonly practiced will be called "additive boosting" hereafter.

After additive boosting, the final model is of a form unlike that of the models in the list of admittedly weak models, and the list of weights is difficult to interpret. Despite considerable experimental success, additive boosting is, from the viewpoint of the end user, disturbingly like the old fable about a committee of blind men who independently examined various parts of an elephant by touch and could not pool their admittedly limited observations into a consensus about the whole animal, as illustrated in FIG. 3. Man 31 feels the elephant's leg 32 and assumes he has encountered a tree. Man 33 feels the elephant's leg 34 and assumes he has encountered a snake. The two men are unable to conclude that they have both encountered an elephant 35.

This interpretability problem is well-known. A large complex model, such as a typical boosted model, with a whole ensemble of base models and their weights, is difficult to understand and explain. This limits the scope of practical applications. There have been attempts to mitigate the interpretability problem with visualization tools applied after models have been built (J. S. Rao and W. J. E. Potts, "Visualizing Bagged Decision Trees", *Proceedings of the Third International Conference on Knowledge, Discovery and Data Mining*, (KDD-97), pp. 243–246 (August 1997). The interpretability problem has been addressed for the special case of Naive Bayes classification as the underlying method of building models and "weight of evidence" as the desired interpretation (G. Ridgeway, D. Madigan, T. Richardson, and J. O'Kane, "Interpretable Boosted Naive Bayes Classification", *Proceedings of the Fourth International Conference on Knowledge, Discovery and Data Mining*, (KDD-98), pp. 101–104 (August 1998).

SUMMARY OF THE INVENTION

It is therefore an object of the present invention to provide a new method of boosting of predictive models, called cascade boosting, for resolving the interpretability problem of previous boosting methods while mitigating the fragmentation problem when applied to decision trees.

According to the invention, there is provided a method of cascade boosting, a form of adaptive resampling, which always applies a single weak model to any given data point. A significant improvement to the common method of boosting lies in how the weak models are organized into a decision list. The decision list is typically smaller than the lists of models and weights generated by the prior art, thus making it easier to interpret the correlations among data.

Each list item before the last item specifies a (possibly complex) condition that a data point might satisfy, along with a unique (possibly weak) model to be applied to any point that satisfies the condition but does not satisfy any conditions from earlier in the list. The list is terminated by a last item that has no condition and merely specifies the model to be applied if none of the conditions in earlier items are satisfied. Various methods of building decision lists are known. Cascade boosting is a new method for building a decision list when given any method for building (possibly weak) models.

Cascade boosting is simplest when applied to segmented predictive models but may also be applied to predictive models that do not explicitly segment the space of possible data points, for instance neural nets. The word "predictive" is omitted hereafter because all models considered here are predictive.

Cascade boosting of segmented models may be applied to decision trees or any other kind of model that segments the space of possible data points into (possibly intersecting) regions (also known as segments) and utilizes a distinct subordinate model for each region, or segment. The regions are often chosen by various means intended to optimize the performance of the overall model.

Decision trees are the most common kind of segmented model. In the common case of decision trees, the tests performed along paths to regions with models that perform well may fragment the space of possible data points. Fragmentation separates points outside the regions with good models, assigning the fragmented points to disjoint small regions that cannot be modeled well in the presence of noise.

In the common case of decision trees, cascade boosting preserves the relatively successful leaves of the tree while reuniting fragments formed by relatively unsuccessful leaves. In the more general case of a segmented model with possibly intersecting segments, a boosted model may be simpler and/or more predictive than the original model generated by the underlying segmentation process on which cascade boosting has been superimposed.

In the most general case of a model that is treated like a black box, cascade boosting replaces a single black box by a cascade of black boxes, each with a corresponding test to decide whether to apply the model gated by the test or continue to the next stage in the cascade. The boosting process itself applies any of the available methods for segmented classification, so as to identify regions where the last stage in the current state of the evolving cascade performs well.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Cascade boosting of segmented models may be applied to decision trees (see, for example, L. Breiman, J. Friedman, R. Olshen, and S. Stone, *Classification and Regression Trees*, Wadsworth (1984), or J. Shafer, R. Agrawal, and M. Mehta, "SPRINT: A Scalable Parallel Classifier for Data Mining", *Proceedings of the 22$^{nd}$ International Conference of Very Large Databases* (1996)), decision lists (see, for example, P. Clark and T. Niblett, "The CN2 Induction Algorithm", *Machine Learning* (3), pp. 319–322 (1989), or S. Weiss and N. Indurkhya, "Optimized Rule Induction", *IEEE Expert* (8:6), pp. 61–19 (1993)), or any other kind of model that segments the space of possible data points into (possibly intersecting) regions (also known as segments) and utilizes a distinct subordinate model for each region. The regions are chosen by various means intended to optimize the performance of the overall model.

Figure 4A:
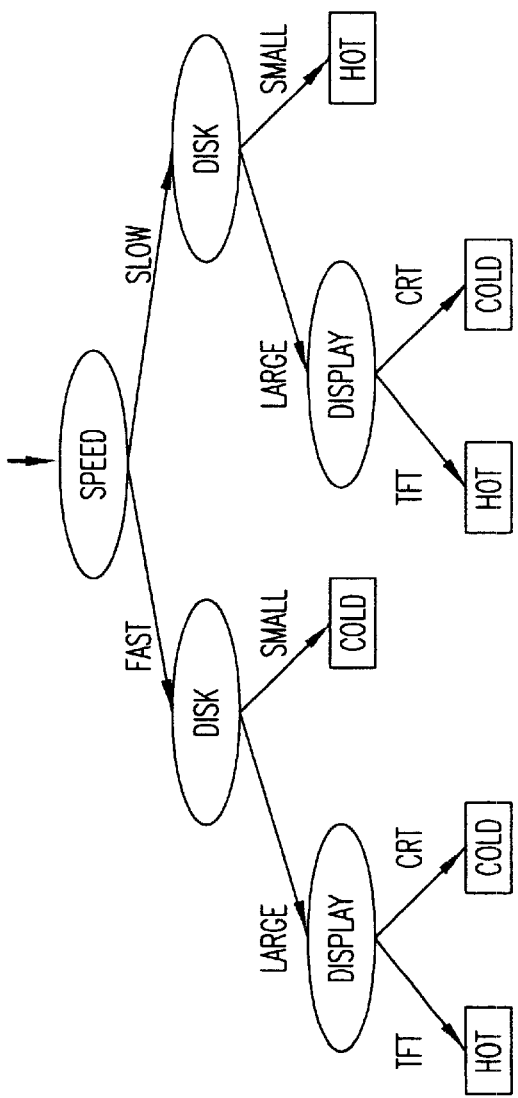
FIGS. 4A and 4B illustrate a decision tree and a less informative decision tree that could results from fragmentation.

FIG. 4A illustrates a decision tree for a simplified version of a problem faced by manufacturers of personal computers. The manufacturer wishes to predict which PC configurations will be HOT, in that they sell well, and which will be COLD, in that they do not. Each data point specifies values for three fields that record three different attributes of a PC: the SPEED of the processor, which may be FAST or SLOW, the size of the DISK drive, which may be LARGE or SMALL, and the type of DISPLAY, which may be TFT (thin-film transistor) or CRT (cathode ray tube). These fields by themselves do not determine whether a PC will be HOT or COLD, but the manufacturer hopes to learn which combinations of field values tend to be HOT and which tend to be COLD. For illustrative purposes, we assume that the market is really as indicated in FIG. 4A. All of the SLOW and SMALL machines are also CRT machines, and they are mostly HOT because they are very cheap. The FAST and LARGE machines with TFT tend to be HOT because they appeal to power users, even though they are very costly. Serious users with less money may settle for a SLOW machine that is still LARGE and still has TFT, so those machines are somewhat more likely to be HOT than COLD. The tree displays a straightforward way to select a model that predicts the most likely sales behavior of any PC the manufacturer might choose to make. Each interior node (an oval shape in the figure) specifies a single field to examine and a branch for each of two mutually exclusive sets of values that exhaust all possibilities. Each leaf node (a rectangular shape in the figure) specifies a model that predicts HOT or COLD with some estimated probability, which is not shown.

Figure 4B:
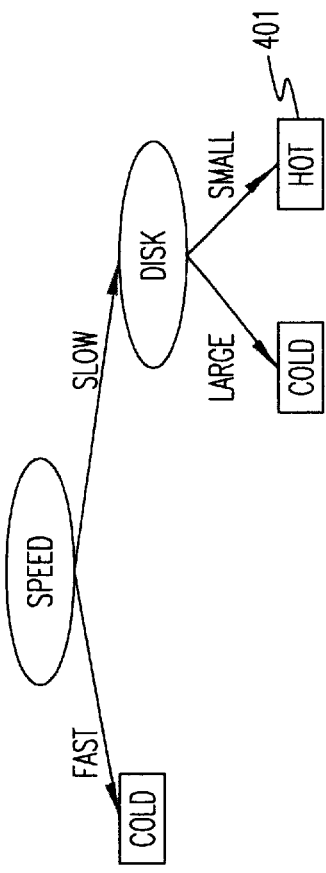

In the simple example of FIG. 4A, where there are only three fields and each field has only two values, there are only eight possible configurations and it is easy to enumerate them. In actual practice, there are many fields and some of them have many more than two possible values. Complete enumeration is not possible, but the manufacturer may try to build a tree that approximates the market by learning from past experience: a population of PCs in various configurations, each of which is known to be either HOT or COLD. Many ways to build a decision tree from such training data points are known, and they all share a vulnerability to fragmentation. The tree builder may well start with a root node that tests SPEED, as does the root of the tree as shown in FIG. 4A, but thereafter the LARGE points on the FAST branch are separate from the LARGE points on the SLOW branch. There may be so few training points with TFT in each of these two subpopulations of the LARGE points that the relevance of testing DISPLAY is either ignored or considered but rejected, as statistical noise. The tree builder may produce the simpler but less informative tree shown in FIG. 4B, where the model predicting HOT is very often correct but the two models predicting COLD are only correct a little more than half the time.

Figure 5B:
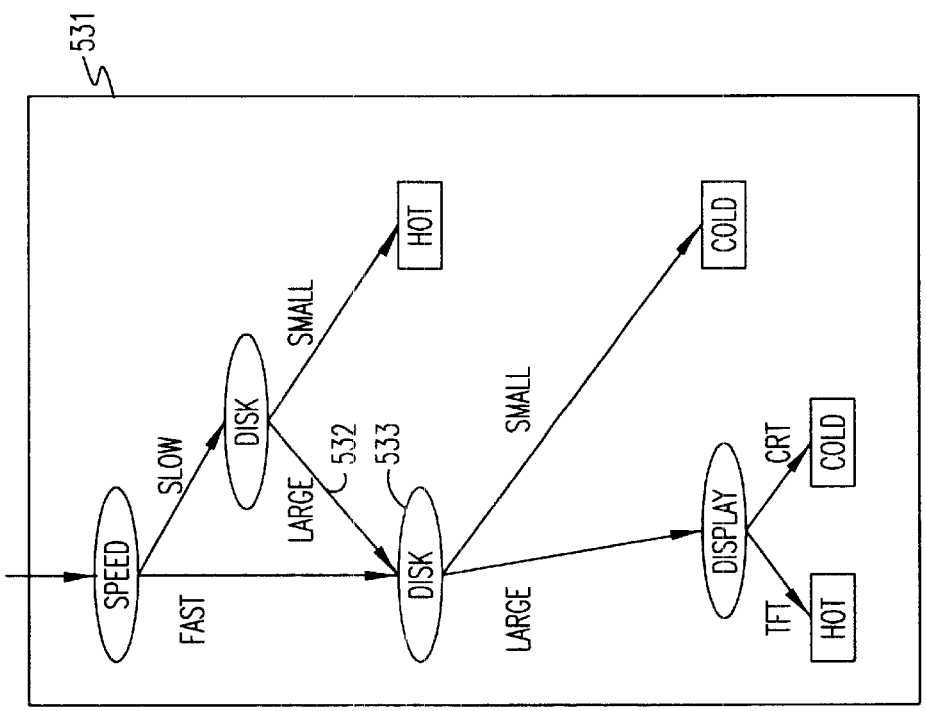
FIGS. 5A and 5B illustrate the ability of cascade boosting to mitigate fragmentation.
Figure 5A:
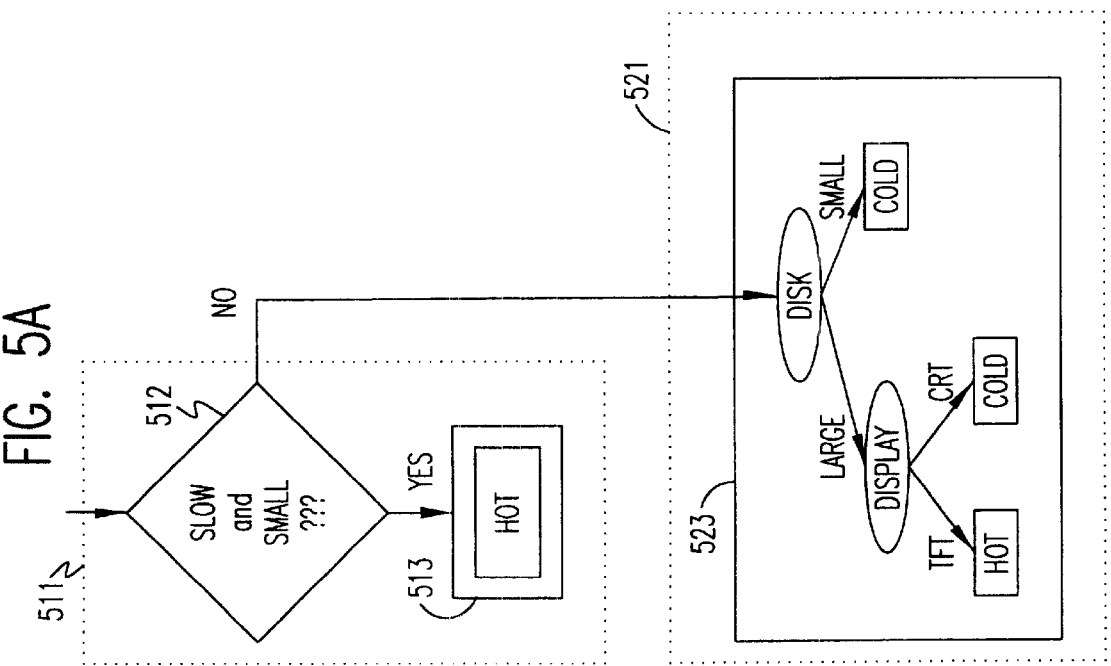

In the common case of decision trees, cascade boosting preserves the relatively successful leaves of the tree while reuniting fragments formed by relatively unsuccessful leaves. Given a tree builder that produces the tree of FIG. 4B, cascade boosting observes that one of the leaves 401, in this case, the one with the model predicting HOT, performs better than the others. The sequence of the branches to the best performer is remembered as the condition in a decision list item, and then the tree builder is given another opportunity, with the subpopulation of training points defined by those that do not satisfy this condition. With all of the LARGE points together, the tree builder has a better chance of recognizing that testing DISPLAY is really relevant. The resulting decision list, shown in the FIG. 5A, is just as informative as the tree shown in FIG. 4A. If desired, the decision list can easily be converted to a decision DAG (directed acyclic graph), as illustrated in FIG. 5B. Moreover, such a DAG can easily be converted to a decision tree. The redundancy in FIG. 5B is an artifact of the simplicity of this example. Having taken the LARGE branch at 532 in FIG. 5B, the value of DISK is already known and it need not be retested again at node 533. In general, however, the branch at 533 determines which of two different subsets contains the value of DISK.

In the more general case of a segmented model with possibly intersecting segments, a boosted model may be simpler and/or more predictive than the original model generated by the underlying segmentation process on which cascade boosting has been superimposed.

In the most general case of a model that is treated like a black box, cascade boosting replaces a single black box by a cascade of black boxes, each with a corresponding test to decide whether to apply the model gated by the test or continue to the next stage in the cascade. The cascade boosting process itself applies any of the available methods for segmented classification, so as to identify regions where the last stage in the current state of the evolving cascade performs well.

Figure 6:
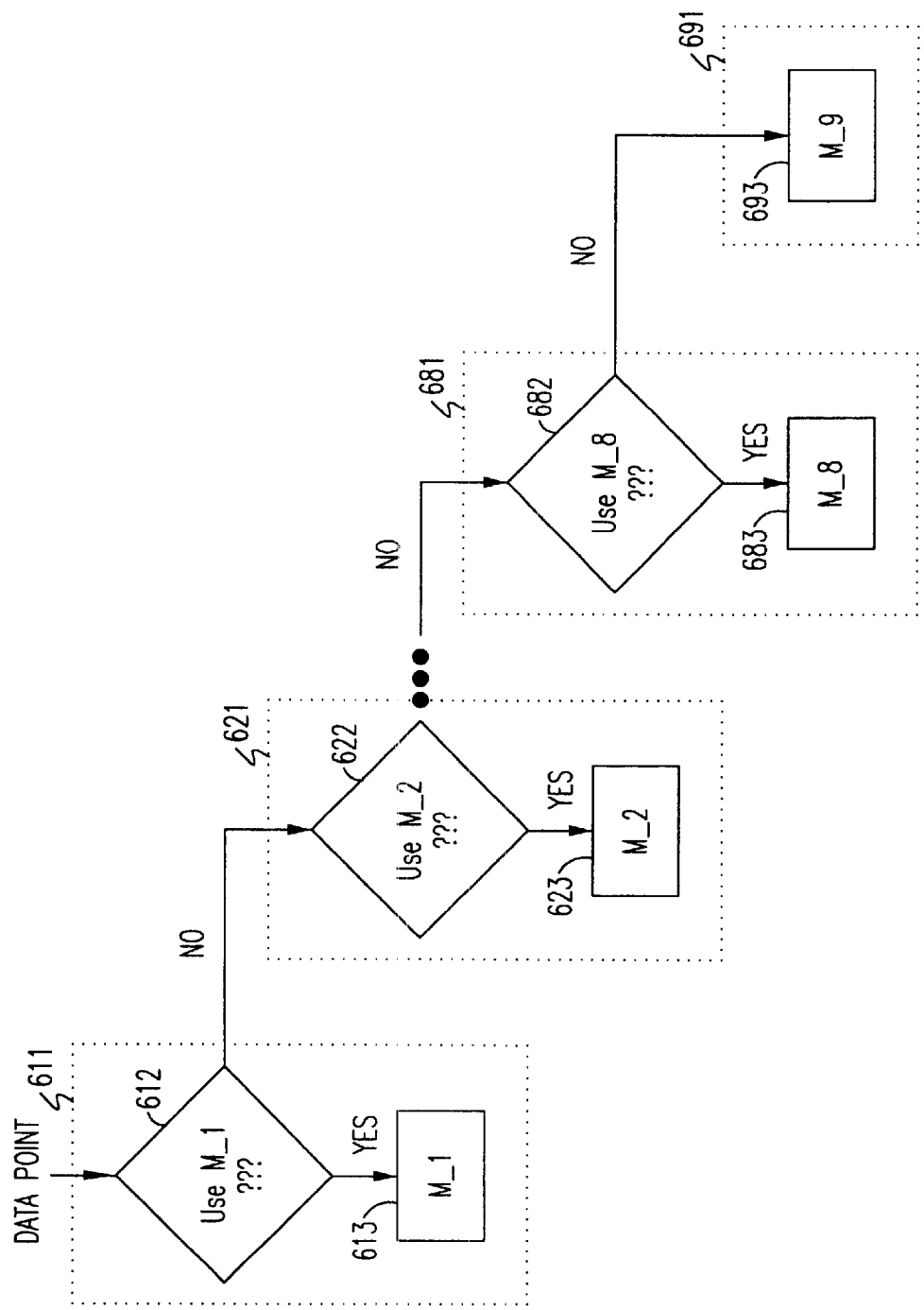
FIG. 6 illustrates the end result of cascade boosting.

In all cases, the end result of cascade boosting is a decision list. Referring now to FIG. 6, the general form of a decision list is shown. The items in the list are blocks 611, 621, 681 and 691. The list could have more or less than the nine items as indicated for purposes of illustration. The first item 611 specifies the gating condition 612 to be tested. If a data point satisfies the gating condition, then the model M_1 613 is to be applied. Otherwise, the next item 621 is to be considered. The next item 621 has the same structure as the first item 611, and the condition 622 is said to gate the application of the model 623. Finally, after item 681 specifies that condition 682 gates application of the model 683, the list is terminated by a final item 691 that is simpler than the others; it merely specifies the model 693 that is to be applied when none of the above conditions are satisfied. For any positive integer J, a decision list of length J can be specified by specifying both a list of J models and a list of J−1 conditions to gate the models. The decision list is terminated by a last item that specifies the J-th model (usually a simple class label itself) for use when none of the J−1 conditions are satisfied. In general, the conditions and models may have their own internal structures. Therefore, a decision list is the end result of cascade boosting, the details depend upon the kind of weak model being used as the base model. In all cases, the sub models, that apply within the specified segment of the example points, are much simpler than the additive boosted tree.

In the common case of decision trees, each condition is the conjunction of the branches taken along the path to a tree leaf with a subordinate model that performs well, and that subordinate model is gated by the condition. The final item specifies a decision tree, as illustrated by the final item 521 that specifies a decision tree 523 in FIG. 5A.

In the more general case of segmented models with possibly intersecting segments, each condition specifies a segment where a segmented weak model performs well. This segment is called S and the weak model is called W. The model gated by the condition is a simplification of W that ignores the examples not in the segment S. The model is the combination of the several segmented weak models built during the cascade boosting process and gating conditions that also routes the examples to be classified to the most appropriate weak model.

In the most general case of models that are treated as black boxes, each condition specifies a segment S from an auxiliary segmented classification model A that attempts to predict where a weak model W will perform well. The model gated by the condition is W itself. The final item specifies one of the several weak models built during the cascade boosting process.

When a decision list is being constructed by appending items one by one to a list, each intermediate state of the evolving list should not, strictly speaking, be called a decision list. The item that is currently the last item specifies a condition gating a model rather than just a model. A list that will become a decision list, as soon as an appropriate last item is appended, will be called an "open-ended" decision list, hereafter.

In common cases, the whole cascade shown in FIG. 6 can easily be expressed in essentially the same form as that of any of the multitude of admittedly weak models in additive boosting. If the initial model is a decision list, then so is the cascade. If the initial model is a decision tree, then the cascade can easily be expressed as a decision DAG (directed acyclic graph) rather than a tree. A decision DAG is as interpretable as a decision tree.

The fragmentation problem has been cited (see P. Domingos, "Efficient Specific-to-General Rule Induction", *Proceedings of the Second International Conference on Knowledge, Discovery and Data Mining*, (KDD-96), pp. 319–322, August 1996) as one of the motivations for replacing decision trees by systems of rules trained on possibly intersecting segments of training data. The high computational costs of building such models have discouraged their use, especially when the presence of both noise and skewed distributions implies that statistical significance requires scanning large numbers of points. When applied to decision trees, cascade boosting uses the same efficient methods ordinarily used to build decision trees.

The closest method to the present invention that is used today is the PART method found in E. Frank and I. H. Witten, "Generating Accurate Rule Sets Without Global Optimization", *Machine Learning: Proceedings of the 15$^{th}$ International Conference* (ICML '98), pp. 144–151, July 1998, which resembles cascade boosting as applied to decision trees. The present invention cascade boosting process has several advantages over the PART process:

(a) Cascade boosting does not restrict attention to decision trees. (For clarity in comparing with the PART method, items below are stated for decision trees.)

(b) Cascade boosting retains however many leaves are likely to perform well, while the PART method retains just one leaf, in each round.

(c) Cascade boosting uses statistically sound estimates (see V. N. Vapnik, "Statistical Learning Theory", John Wiley and Sons: 1998) to determine which leaves are likely to perform well, while the PART method just retains the leaf covering the most training points.

(d) Cascade boosting is completely independent of the underlying method for constructing decision trees, while the PART method is tied to particular methods of growing and pruning that are said to support discovery of the leaf covering the most training points after growing only part of the tree.

The estimates in item (c) may be derived from performance on either training data or (preferably) separate validation data. Items (b) and (d) are closely related: each round can accomplish more, so there is less concern about the cost of constructing the decision tree for each round.

Figure 1:
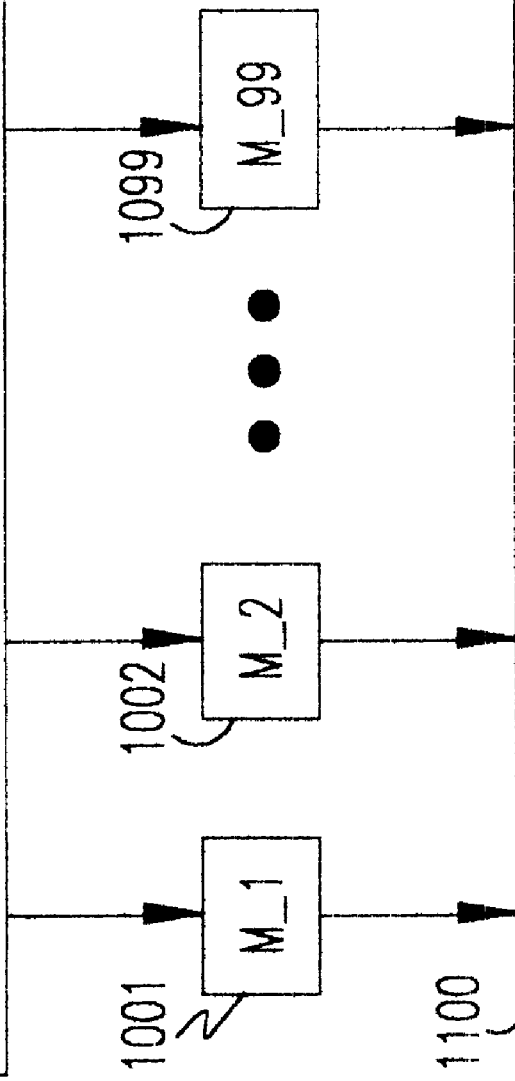
FIG. 1 illustrates the end result of additive boosting.
Figure 2:
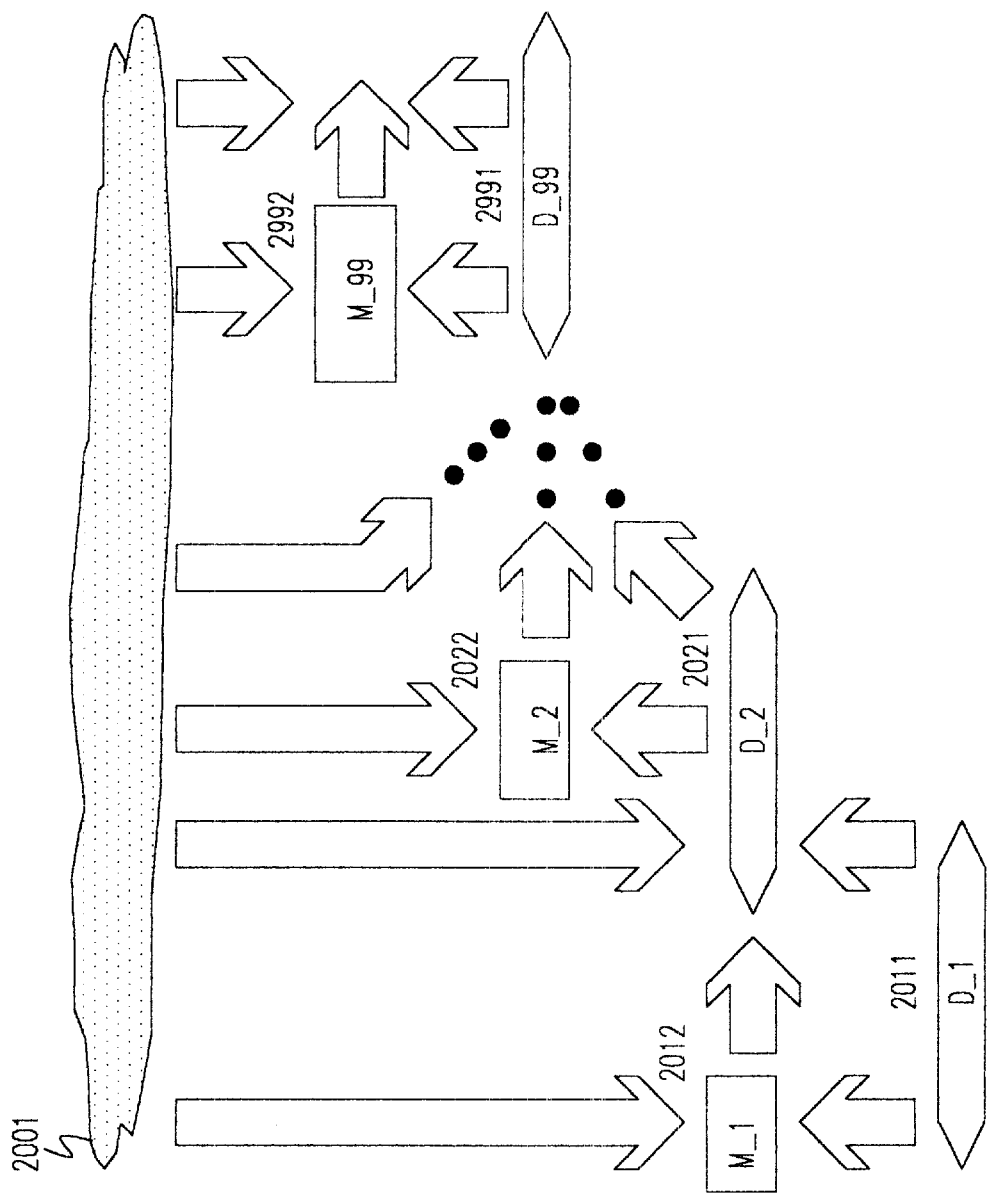
FIG. 2 illustrates the method of additive boosting.
Figure 3:
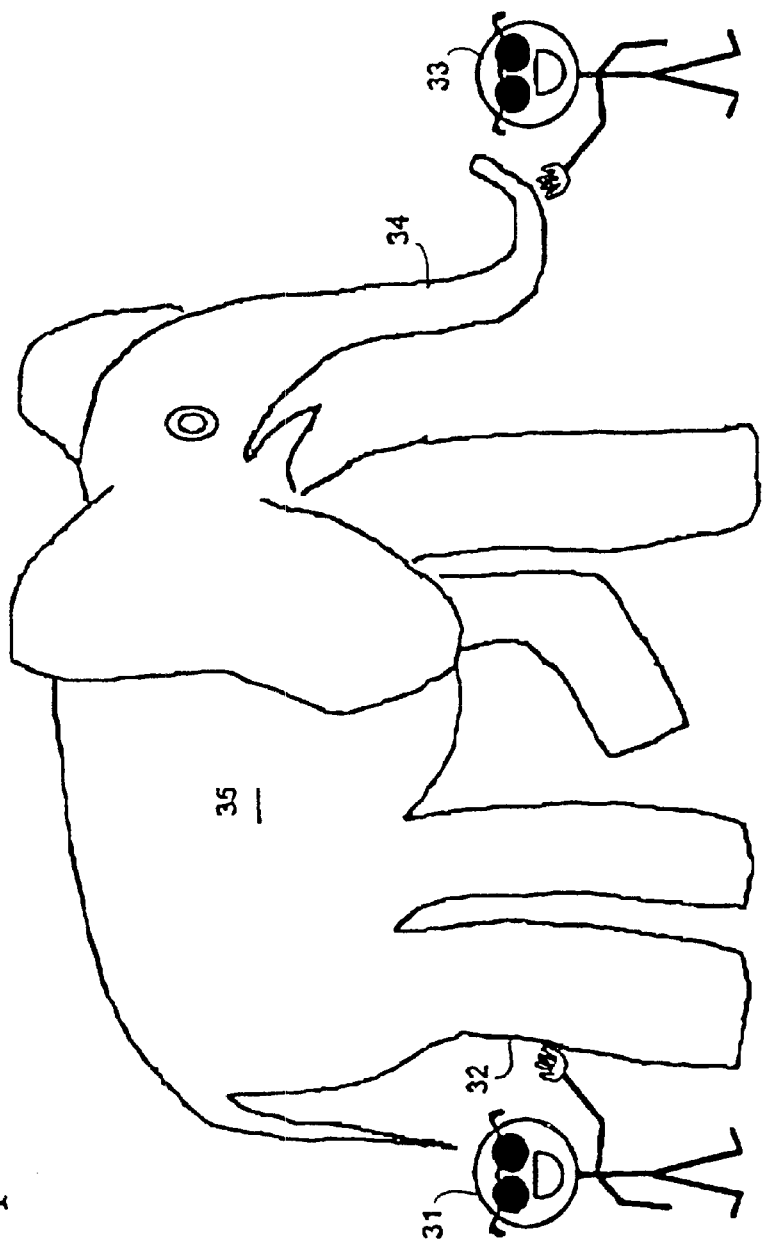
FIG. 3 illustrates the interpretability problem of additive boosting by analogizing the problem to an old fable about a committee of blind men who could not pool their admittedly limited observations into a consensus.

In a decision tree, the application conditions for the subordinate models are mutually exclusive, i.e., each data point is found in only one segment of the population, a segment being the leaf node and the sub model being the constant class label designation for all points that belong to the leaf node. When exclusivity is not present, an adaptively segmented model needs a process to determine what to predict when several subordinate models are applicable to the same point. Such a process is called "arbitration" hereafter. The simplest kind of arbitration is winner-take-all: one of the applicable models is chosen and applied, while the rest are ignored. A decision list, as shown in FIG. 4, has winner-take-all arbitration because it applies the first applicable model in a fixed list. Some segmented models use other forms of arbitration, such as a weighted average (as in the extreme case of additive boosting, as shown in FIG. 1 where all sub models are applied to all examples, i.e., there is only one segment) of the predictions made by the subordinate models applicable at any given point.

Figure 7:
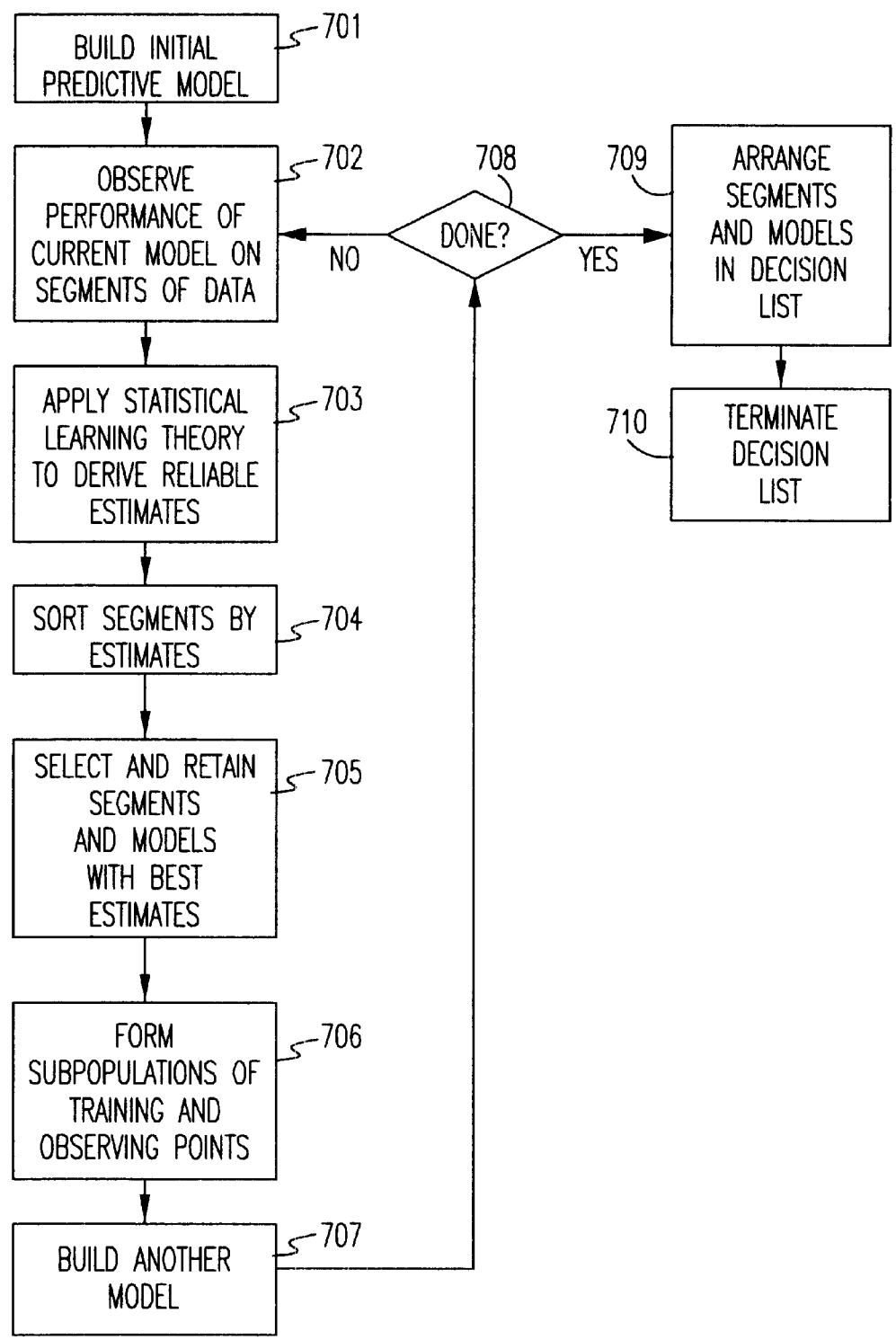
FIG. 7 is a flow diagram illustrating the method of cascade boosting for segmented base models, such as decision trees, with mutually exclusive segments.

Referring now to FIG. 7, a flow diagram for cascade boosting of a decision tree is shown. Recall that segments of the population in a decision tree are always mutually exclusive. An initial predictive model is built in block 701 that applies to one or more subordinate models for a set of initial training data points. The accuracy performance of the current model, initially the initial predictive model, is observed in block 702. The observed performance of each subordinate model on its corresponding segment (of either the training data or separate validation data) is used to estimate future accuracy performance. Statistical learning theory (V. N. Vapnik, "Statistical Learning Theory", supra) is applied to derive reliable estimates in light of the varying sizes of the segments in block 703. Good performance on a large segment is more trustworthy than good performance on a small segment, and statistical learning theory is applied to merge observed performance and observed size into a single number that provides a bound on how bad future performance might be. The subordinate models are sorted by their estimated future performance in block 704. Those segments with the best estimates are selected and retained in block 705, along with the associated subordinate models, where "best estimates" can be the top one or two with most accurately best performance.

The next round of resampling of remaining data points may let the underlying method for building models work with as much of the remaining training data as it can, where the remaining points are those not already in segments defined by the application conditions (i.e., gating condition) of the subordinate models with the best estimates. A subpopulation of the remaining points is formed in block 706. Thus, the above process is repeated with only a subset of the data being run through the models. The underlying method for building models produces a new current model trained on the resampled data in block 707 and the performance is observed and estimates derived for this new current model beginning in block 702. The resulting subordinate models are sorted by their estimated future performance, and so on. Each round need only deal with points not already in segments defined by the gating application conditions of the subordinate models retained by previous rounds.

Once the desired number of iterations is complete as determined in decision block 708, the retained segments and models are then arranged in a decision list in blocks 709 and 710. In block 709 an open-ended decision list is built with items ordered in the same order in which segments were selected and retained in block 705. In the list item defined for any one mutually exclusive segment, the model gated by membership in that segment is the corresponding subordinate model. The decision list is terminated in block 710 with one of the weak models that have been built, preferably the last one.

Various stopping criteria may be used in decision block 708. Suppose M_K is the current weak model, for the first positive integer K such that the observed performance of M_K on the K-th population of observing points is nearly as good in performance as the best estimated performance of subsequent M_K+1 candidate models for any segment of that population, stopping at K or earlier is preferred. For each positive integer J such that J≦K, stopping at J means building a decision list of length J, using J−1 conditions and J models.

To stop earlier without missing opportunities for improved performance, a straightforward search may be performed after K weak models have been built. For each positive integer J, such that J≦K, the overall performance on the observing points that would result from stopping at J may be computed readily from observations already made at each step and from similar observations that one skilled in the art can readily add to each step.

If K is suitably small when compared to the number of observing points, then the J value with the best observed performance may be chosen. Otherwise, statistical learning theory may be applied to avoid the well-known pitfall of overfitting when choosing among many models by comparing performance on one set of points. Specifically, the principal of structural risk minimization (see V. N. Vapnik, "Statistical Leaning Theory", supra) may be applied A brief explanation follows.

An increasing sequence of sets of J values is chosen such as

{1}; {1,2}; {1,2,3}; . . . ; {1,2,3, . . . ,K}.

Let N be the number of J values that appear in a given set. The J value with the best observed performance is chosen, and the observed performance with J is adjusted to provide a reliable estimate that bounds future performance. The adjustment depends upon N as well as the number of observing points, so the adjustment for J chosen from a set with large N is greater than the adjustment for J chosen from a set with small N. Now there are K tentatively chosen values of J (one for each set in the increasing sequence), and the ordering among estimates bounding future performance may differ from the ordering of observed performance. Among these K values of J, the one with the best estimate is to be chosen.

In the more general case of boosting a segmented model with possibly intersecting segments, i.e. data points fall within more than one segment, and some form of arbitration, the tests appearing in the cascade are those defining the segments where the entire current model performs relatively well, even if the subordinate model associated with such a segment fails to perform well by itself (without the benefit of arbitration). This case is therefore more complicated than the case of a decision tree, as the following example illustrates. Suppose, in the case of census data, the model predicts income. Suppose one weak model correlates age with income and another model correlates occupation with income. Subordinate model M_age predicts high income for a segment defined by a range of age values, while subordinate model M_occ predicts high income for a segment defined by a set of occupation values. If the model as a whole does well on the occupation segment, but it gets the predictions by using both M_age and M_occ, then M_age and the age defined segment to which it applies must be integrated into the boosted model.

Referring to FIG. 7, integration is accomplished by doing somewhat more work in blocks 705 and 709. After the segments with the best estimates have been selected and retained in block 705, all other segments intersecting those best segments are separately selected and retained, along with their corresponding subordinate models.

When a decision list item is constructed in block 709, the condition is still specified to be membership in one of the segments with the best estimates from some execution of block 705. This is to be called segment S. The model gated by the condition is no longer just the subordinate model corresponding to S in the then-current weak model from the execution of block 705 that selected and retained S. The model gated by the condition is now a simplification of that then-current weak model. The simplification is obtained by discarding segments disjoint from S. Specifically, the segments of the gated weak model are those segments intersecting S that were selected and retained by the same execution block 705 that selected and retained S. The corresponding subordinate models of the [fated] gated weak model are the corresponding subordinate models of the then-current weak model, which were also selected and retained in block 705. The arbitration method of the gated weak model is whatever arbitration method was used in the then-current weak model.

In the most general case, where the model to be boosted is treated like a black box, the observed performance of the entire current model at each point is compared with the overall observed average performance of the entire current model on the entire pertinent set of points (of either the training data or separate validation data). Here, the black box could be a neural net or some other model that does not explicitly segment the population of points, but only provides a resulting prediction when given a data point. The points where the observed performance is substantially better than the average form one class, while the remaining points form another class in a two-class classification problem, for which an auxiliary classification model is constructed by adaptive segmentation. The segments found by the auxiliary classification model are used as in the less general case. The entire current model plays the role played by a subordinate model in the case of decision trees or by a simplified version of the entire current model in the case of segmented models with arbitration.

Referring to FIG. 7, black box weak models require doing more work in block 702 and somewhat less work in blocks 705 and 709. To obtain segments in block 702, the current population of observing points is taken to be the training data for an auxiliary classification problem. After the average performance over the entire current population of observing points has been observed, each point is labeled either WELL or POOR, depending on whether the current weak model performs relatively well, or relatively poorly when applied to that one point. The auxiliary problem is to predict whether a point is in class WELL or in class POOR without actually applying the current weak model. Any of the existing methods for building segmented classification models may be used for building a model that addresses the auxiliary classification problem, and the actual performance of the current weak model on the segments of the auxiliary model may then be observed, as in block 702 for the case of segmented models.

When a segment is selected and retained in block 705, there is no need to select and retain any subordinate models. The current weak model itself is retained for future use in block 709. When a decision list item is constructed in block 709, the model gated by testing for membership in a segment is simply the same model that was the current weak model when the segment was selected and retained in block 705.

EXAMPLE

A very preliminary implementation was accomplished using extensions of the ProbE (Probability Estimation) data mining libraries developed by International Business Machine Corp. to implement most major processing steps. The models to be boosted were (binary) decision trees generated by the SPRINT classifier (J. Shafer, R. Agrawal, and M. Mehta, "SPRINT: A Scalable Parallel Classifier for Data Mining", supra), a well-known method developed by International Business Machine Corp. and marketed by International Business Machine Corp. as part of the Intelligent Miner product. The preliminary implementation deals only with decision trees and with error estimates based on training data. The unpublished IBM Research Report RC-21483, C. Apte, E. Grossman, E. Pednault, B. Rosen, F. Tipu, and B. White, "Probabilistic Estimation Based Data Mining for Discovering Insurance Risks", Aug. 9, 1999, herein incorporated by reference, describes an application that uses the ProbE data mining libraries.

The training and test data were taken from the UCI/adult benchmark (i.e. the "Adult Census Data" benchmark in the public repository at the University of California, Irvine). There are 32561 training points and 16281 test data points. There are 14 fields, representing independent variables in each data point. Predictions were made for the $15^{th}$ field, a binary dependent variable named "class" with possible values named ">50K" (for income above $50,000) and "<=50K" (for income at most $50,000). The model generated by the SPRINT classifier had an error rate of 13.85% on the test data, and this rate is better (lower) than all of the rates cited in the documentation of the benchmark. Improving upon the SPRINT model was a challenging task.

Imported into ProbE data mining libraries by expressing each tree leaf as a rule, the initial SPRINT model had 83 rules that perform 604 tests. These rules varied widely in how many points they cover and how well they perform. After the rules were sorted by estimated future error rates:

- rule 1 covers 678 training points with an observed error rate of 0.4% on those points, yielding an estimated future error rate of 1.2%;
- rule 2 covers 13977 training points with an observed error rate of 2.4% on those points, yielding an estimated future error rate of 2.6%;
- rule 6 covers 1484 training points with an observed error rate of 5% on those points, yielding an estimated future error rate of 6.0%;
- rule 7 covers 318 training points with an observed error rate of 4% on those points, yielding an estimated future error rate of 6.3%; . . .
- rule 83 covers 8 training points with an observed error rate of 25% on those points, yielding an estimated future error rate of 83%.

As was explained above in reference to FIG. 5, the estimated error rates are bounds on how badly the rules might perform on new data points in the future, given how they were observed to perform on a limited number of points. In particular, rule 7 has an observed error rate of 4% on 318 points. The actual error rate on any other points is unknown, but statistical learning theory (see V. N. Vapnik, "Statistical Learning Theory", supra) implies that a rule with an actual rate as high as 6.3% could still perform as well as 4% by chance on that many points.

Round 1 of cascade boosting retained the first six (6) rules, which covered half of the training points. (Under the stipulations of the PART method, on the other hand, only rule 2 would be chosen.) All of these rules had estimates below half of the observed rate on the training data as a whole, even though each rule's estimate was adjusted upward from the rule's observed rate by an amount dependent on the number of points involved. Subsequent rounds were less dramatic.

After 25 rounds, the cascade had 65 rules that perform 289 tests, so the resulting cascade was about half the size of the original model. The cascade's observed error rate of 13.89% on the test data is not significantly different from the original 13.85% and was still below all of the rates cited in the documentation of the benchmark. This reduction in model size is important in the interpretation of the overall model as discussed above with respect to interpretation problems.

CONCLUSION

The resampling done by the preliminary implementation is deterministic. Each point in a segment where the evolving cascade performs well is invisible to the next round, which trains on all of the points that are still visible. Deterministic resampling is recommended when (as is the case with the SPRINT classifier on most data sets) the underlying model-building method can work with all the data. Cascade boosting can also be implemented with any of the resampling schemes used in additive boosting. As many points as the underlying model-building method can handle at once may be chosen at random, subject to the condition that points where the evolving cascade performs well are much less unlikely to be chosen than points where it performs poorly. Any point-weighting function used in additive boosting may be used. Deterministic resampling is the limiting case where each point is weighted either 0 or 1.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of boosting of predictive models that apply subordinate models to data points in mutually exclusive segments, called cascade boosting, for resolving an interpretability problem of previous boosting methods, while mitigating a fragmentation problem when applied to decision trees, said method comprising the steps:

(a) building an initial predictive model, which initially is a current model, that applies at least one subordinate model to a plurality of data points in mutually exclusive segments, the initial predictive model being built from an initial population of training data points;

(b) observing performance of the current model, which is initially the initial predictive model, when applied to each mutually exclusive segment of a current population of observing data points, which is initially either the initial population of training data points or a separate initial population of data points reserved for observing performance;

(c) applying statistical learning theory to derive a reliable estimate bounding future performance of the current model on each mutually exclusive segment, the reliable estimate being derived for each mutually exclusive segment from the observed performance together with a number of observing data points falling within a mutually exclusive segment;

(d) sorting mutually exclusive segments by estimates;

(e) selecting and retaining a fraction of the mutually exclusive segments, and also retaining each subordinate model associated with the mutually exclusive segment, the selection resulting in retention of segments with better estimates;

(f) forming a subpopulation of training points by sampling from the current population of training points so as to exclude, either with certainty or with high probability, each point falling within the selected and retained segments;

(g) forming a subpopulation of observing data points by sampling from the current population of observing data points so as to exclude, either with certainty or with high probability, each point falling within the selected and retained segments;

(h) building another predictive model which becomes the current model, the current model applying at least one subordinate model to a plurality of data points in mutually exclusive segments, and being built from the subpopulation of training points formed in step (f);

(i) repeating steps (b) to (h) a desired number of times, with the subpopulation of training points as the current population of training points and with the subpopulation of observing data points as the current population of observing data points;

(j) arranging selected and retained mutually exclusive segments having better estimates in an open-ended decision list, where each item in the open-ended decision list specifies a test for membership in one of the selected and retained segments having better estimates and specifies that, if a point passes the membership test, then a prediction for the point is to be obtained by using the prediction of the subordinate model corresponding to the retained mutually exclusive segment; and (k) terminating the open-ended decision list with one of the models built in step (a) or step (h) and resulting in a terminated decision list, thereby solving the problem of model interpretability while mitigating the fragmentation problem.

2. A computer implemented method as recited in claim 1, wherein the step (b) of observing performance further comprises the step of observing performance of the current model when applied to an entire current population of observing points; and wherein the step (d) of sorting further comprises the step of comparing the observed performance of the current model when applied to the entire current population of observing points, as determined in step (b) with sorted estimates as derived in step (d) and continuing with step (j), if an estimate as derived in step (d) is not substantially better than the observed performance.

3. A computer implemented method as recited in claim 2, wherein a counter K is initialized to a value of 1 in step (a) and incremented to K+1 in step (h) when a new predictive model is built so that the current model is called a K-th current model for each value of counter K, the arranging step (j) further comprising the steps:

selecting a value J in a range of 1 to the value of counter K;

discarding segments and subordinate models that were selected and retained in step (e) for the K-th current model, for all repetitions where K is greater than J;

discarding the K-th current model that was built in step (a) or (h), for all repetitions where K is not equal to J, wherein the terminated decision list as generated in step (k) is terminated with the K-th current model, where K is equal to J, as selected in the selecting step, thereby choosing a number of repetitions from an adaptively determined range of possibilities.

4. A computer implemented method as recited in claim 3, wherein the number of repetitions J is chosen from an ad adaptively determined range of possibilities by optimizing observed performance when applied to an initial population of observing points and the step of selecting a value J in the arranging step (j) further comprises the steps:

combining, for each possible choice of values for J in a range of 1 to K, the observed performance of the K-th current model when applied to every mutually exclusive segment of a K-th population of observing points selected and retained in step (e), where the value of counter K is less than J, with the observed performance of the K-th current model when applied to an entire K-th population of observing points, where the value of counter K is equal to J, thereby determining the observed performance when applied to the initial population of observing points that would result from choosing a value for J; and choosing a value for J to optimize observed performance as determined in step (a), and choosing the number of repetitions J from an adaptively determined range of possibilities by optimizing observed performance when applied to the initial population of observing points.

5. A computer implemented method as recited in claim 3, wherein the number of repetitions J is chosen from an adaptively determined range of possibilities by optimizing a reliable statistical estimate bounding future performance, and the step of selecting a value J in the arranging step (j) further comprises the steps:

combining, for each possible choice for J in a range from 1 to the value of counter K as selected in step (j), the observed performance of the K-th current model when applied to every mutually exclusive segment of an entire K-th population of observing points that was selected and retained in step (e), where the value of counter K is less than J, with the observed performance of the K-th current model when applied to the entire K-th population of observing points, where the value of counter K is equal to J, thereby determining the observed performance when applied to the initial population of observing points that would result from choosing a value for J;

forming an increasing sequence of sets of possible choices for the value J in a range from 1 to the value of counter K and ending the sequence of sets with a set comprising all possible choices;

selecting, for each set of possible choices formed in the forming step, the value of J that optimizes observed performance for the set, as determined in the combining step;

deriving a reliable estimate bounding future performance with the value of J selected in the selecting step by applying statistical learning theory, for each set of possibilities formed in the forming step, the estimate being derived from parameters, wherein the parameters are selected from a group consisting of the observed performance with J, the number of possibilities in the set, and the number of observing points; and selecting the value of J to optimize estimated performance as determined in the deriving step.

6. A computer implemented method of boosting of predictive models that apply subordinate models to data points in possibly intersecting segments and arbitrate among the predictions of applicable subordinate models whenever a point falls within two or more segments, called cascade boosting, for resolving an interpretability problem of previous boosting methods, said method comprising the steps:

(a) building an initial predictive model, which initially is a current model, that applies at least one subordinate model to a plurality of data points in possibly intersecting segments and arbitrates among the predictions of the applicable subordinate models whenever a point falls within two or more segments, the initial predictive model being built from an initial population of training data points;

(b) observing performance of the current model, which is initially the initial predictive model, when applied to each segment of a current population of observing data points, which is initially either the initial population of training data points or a separate initial population of data points reserved for observing performance;

(c) applying statistical learning theory to derive a reliable estimate bounding future performance of the current model on each segment, the estimate being derived for each segment from the observed performance together with a number of the observing data points falling within the segment;

(d) sorting the segments by the estimates;

(e) selecting and retaining a fraction of the segments, and also retaining each subordinate model associated with the segment, the selection resulting in retention of segments with better estimates, while separately selecting and retaining each additional segment intersecting the segments with better estimates, and also retaining each subordinate model associated with each additional segment;

(f) forming a subpopulation of training points by sampling from the current population of training points so as to exclude, either with certainty or with high probability, each point falling within selected and retained segments having better estimates and the additional segments;

(g) forming a subpopulation of observing data points by sampling from the current population of observing data points so as to exclude, either with certainty or with high probability, each point falling within the selected and retained segments having better estimates and the additional segments;

(h) building another predictive model which becomes the current model, the current model applying at least one subordinate model to a plurality of data points in possibly intersecting segments and arbitrating among predictions of applicable subordinate models whenever a point falls within two or more segments, and being built from the subpopulation of training points;

(i) repeating steps (b) to (h) a desired number of times, with the subpopulation of training points as the current population of training points and with the subpopulation of observing data points as the current population of observing data points;

(j) arranging the selected and retained segments having better estimates in an open-ended decision list, where each item in the open-ended decision list specifies a test for membership in one of the selected and retained segments having better estimates and specifies that, if a point passes a membership test, then a prediction for the point is to be obtained by arbitrating among predictions of all pertinent models, the pertinent models being subordinate models corresponding to selected and retained segments within which the point falls, the selected and retained segments having been selected and retained in execution of step (e) that selected and retained the segment in the membership test as one of the segments having better estimates;

(k) terminating the open-ended decision list with one of the models built in step (a) or step (h) and resulting in a terminated decision list, thereby solving the problem of model interpretability.

7. A computer implemented method as recited in claim 6, wherein the step (b) of observing performance further comprises the step of observing performance of the current model when applied to an entire current population of observing points; and wherein the step (d) of sorting further comprises the step of comparing the observed performance of the current model when applied to the entire current population of observing points, as determined in step (b) with the sorted estimates as derived in step (d) and continuing with step (j), if an estimate as derived in step (d) is not substantially better than an observed performance.

8. A computer implemented method as recited in claim 7, wherein a counter K is initialized to a value of 1 in step (a) and incremented to K+1 in step (h) when a new predictive model is built so that the current model is called a K-th current model for each value of counter K, the arranging step (j) further comprising the steps:

selecting a value J in a range of 1 to the value of counter K;

discarding segments and subordinate models that were selected and retained in step (e) for the K-th current model, for all repetitions where K is greater than J;

discarding the K-th current model that was built in step (a) or (h), for all repetitions where K is not equal to J, wherein the terminated decision list as generated in step (k) is terminated with the K-th current model, where K is equal to J, as selected in the selecting step, thereby choosing a number of repetitions from an adaptively determined range of possibilities.

9. A computer implemented method as recited in claim 8, wherein the number of repetitions J is chosen from an adaptively determined range of possibilities by optimizing observed performance when applied to an initial population of observing points and the step of selecting a value J in the arranging step (j) further comprises the steps:

combining, for each possible choice of values for J in a range of 1 to K, the observed performance of the K-th current model when applied to every segment of a K-th population of observing points selected and retained in step (e) as a segment with a better estimate, where the value of counter K is less than J, with the observed performance of the K-th current model when applied to an entire K-th population of observing points, where the value of counter K is equal to J, thereby determining the observed performance when applied to the initial population of observing points that would result from choosing a value for J; and choosing a value for J to optimize observed performance as determined in step (a), and choosing the number of repetitions J from an adaptively determined range of possibilities by optimizing observed performance when applied to the initial population of observing points.

10. A computer implemented method as recited in claim 8, wherein the number of repetitions J is chosen from an adaptively determined range of possibilities by optimizing a reliable statistical estimate bounding future performance, and the step of selecting a value J in the arranging step (j) further comprises the steps:

combining, for each possible choice for J in a range from 1 to the value of counter K as selected in step (j), the observed performance of the K-th current model when applied to every mutually exclusive segment of an entire K-th population of observing points that was selected and retained in step (e), where the value of counter K is less than J, with the observed performance of the K-th current model when applied to the entire K-th population of observing points, where the value of counter K is equal to J, thereby determining the observed performance when applied to the initial population of observing points that would result from choosing a value for J;

forming an increasing sequence of sets of possible choices for the value J in a range from 1 to the value of counter K and ending the sequence of sets with a set comprising all possible choices;

selecting, for each set of possible choices formed in the forming step, the value of J that optimizes observed performance for the set, as determined in the combining step;

deriving a reliable estimate bounding future performance with the value of J selected in the selecting step by applying statistical learning theory, for each set of possibilities formed in the forming step, the estimate being derived from parameters, wherein the parameters are selected from a group consisting of the observed performance with J, the number of possibilities in the set, and the number of observing points; and selecting the value of J to optimize estimated performance as determined in the deriving step.

11. A computer implemented method of boosting of black box predictive models, called cascade boosting, for resolving an interpretability problem of previous boosting methods, said method comprising the steps:

(a) building an initial black box predictive model, the initial black box predictive model being built from an initial population of training data points;

(b) observing performance of a current model, which is initially the initial black box predictive model, when applied to each point in a current population of observing data points, which is initially either the initial population of training data points or a separate initial population of data points reserved for observing performance;

(c) classifying each point in the current population of observing data points as being in one of two classes, a first class for points where the current model performs well and a second class for points where the current model does not perform well;

(d) building a current auxiliary model, the auxiliary model being a segmented predictive model for classification into either the first or second class as specified in step (c), and built from the current population of observing data points, which may utilize either mutually exclusive segments, or intersecting segments;

(e) applying statistical learning theory to derive a reliable estimate bounding future performance of the current model on each segment, the estimate being derived for each segment from the observed performance together with a number of the observing data points falling within the segment;

(f) sorting the segments by the estimates;

(g) selecting and retaining a fraction of the segments, and also retaining each auxiliary model associated with selected segments, the selection resulting in retention of segments with better estimates;

(h) forming a subpopulation of training points by sampling from the current population of training points so as to exclude, either with certainty or with high probability, each point falling within selected and retained segments;

(i) forming a subpopulation of observing data points by sampling from the current population of observing data points so as to exclude, either with certainty or with high probability, each point falling within the selected and retained segments;

(j) building another black box predictive model which becomes the current model, the current model being built from the subpopulation of training points;

(k) repeating steps (b) to (j) a desired number of times, with the subpopulation of training points as the current population of training points and with the subpopulation of observing data points as the current population of observing data points;

(l) arranging the selected and retained segments having better estimates in an open-ended decision list, where each item in the open-ended decision list specifies a test for membership in one of the selected and retained segments having better estimates and specifies that, if a point passes the membership test, then the prediction for the point is to be obtained by using the prediction of the black box predictive model retained in the same execution of step (g) that selected and retained the segment in the membership test as one of the segments having better estimates;

(m) terminating the open-ended decision list with one of the models built in step (a) or step (j) and resulting in a terminated decision list, thereby solving the problem of model interpretability.

12. A computer implemented method as recited in claim 11, wherein the step (b) of observing performance further comprises the step of observing performance of the current model when applied to the entire current population of observing points; and wherein the step (f) of sorting further comprises the step of comparing the observed performance of the current model when applied to an entire current population of observing points, as determined in step (b) with the sorted estimates as derived in step (f) and continuing with step (l), if an estimate as derived in step (f) is not substantially better than observed performance.

13. A computer implemented method as recited in claim 12, wherein a counter K is initialized to a value of 1 in step (a) and incremented to K+1 in step (j) when a new predictive model is built so that the current model is called a K-th current model for each value of counter K, the arranging step (l) further comprising the steps:

selecting a value J in a range of 1 to the value of counter K;

discarding segments that were selected and retained in step (g) for the K-th current model, for all repetitions where K is greater than J;

discarding the K-th current model that was built in step (a) or (j), for all repetitions where K is not equal to J, wherein the terminated decision list as generated in step (m) is terminated with the K-th current model, where K is equal to J, as selected in the selecting step, thereby choosing a number of repetitions from an adaptively determined range of possibilities.

14. A computer implemented method as recited in claim 12, wherein the number of repetitions J is chosen from an adaptively determined range of possibilities by optimizing observed performance when applied to an initial population of observing points and the step of selecting a value J in the arranging step (l) further comprises the steps:

combining, for each possible choice of values for J in a range of 1 to K, the observed performance of a K-th model when applied to every segment of a K-th population of observing points selected and retained in step (g) as a segment with a better estimate, where the value of counter K is less than J, with the observed performance of the K-th model when applied to an entire K-th population of observing points, where the value of counter K is equal to J, thereby determining the observed performance when applied to the initial population of observing points that would result from choosing a value for J; and choosing a value for J to optimize observed performance as determined in step (a), and choosing the number of repetitions J from an adaptively determined range of possibilities by optimizing observed performance when applied to the initial population of observing points.

15. A computer implemented method as recited in claim 12, wherein the number of repetitions J is chosen from an adaptively determined range of possibilities by optimizing a reliable statistical estimate bounding future performance, and the step of selecting a value J in the arranging step (l) further comprises the steps:

combining, for each possible choice for J in a range from 1 to the value of counter K as selected in step (l), the observed performance of the K-th current model when applied to every mutually exclusive segment of the entire K-th population of observing points that was selected and retained in step (g), where the value of counter K is less than J, with the observed performance of a K-th current model when applied to an entire K-th population of observing points, where the value of counter K is equal to J, thereby determining the observed performance when applied to the initial population of observing points that would result from choosing a value for J;

forming an increasing sequence of sets of possible choices for the value J in a range from 1 to the value of counter K and ending the sequence of sets with a set comprising all possible choices;

selecting, for each set of possible choices formed in the forming step, the value of J that optimizes observed performance for the set, as determined in the combining step;

deriving a reliable estimate bounding future performance with the value of J selected in the selecting step by applying statistical learning theory, for each set of possibilities formed in the forming step, the estimate being derived from parameters, wherein the parameters are selected from a group consisting of the observed performance with J, a number of possibilities in the set, and the number of observing points; and selecting the value of J to optimize estimated performance as determined in the deriving step.

* * * * *